(12) United States Patent
Asano

(10) Patent No.: US 7,173,629 B2
(45) Date of Patent: Feb. 6, 2007

(54) IMAGE PROCESSOR WITH THE CLOSED CAPTION FUNCTION AND IMAGE PROCESSING METHOD

(75) Inventor: Masanari Asano, Miyagi (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 312 days.

(21) Appl. No.: 09/813,035

(22) Filed: Mar. 21, 2001

(65) Prior Publication Data

US 2001/0026279 A1 Oct. 4, 2001

(30) Foreign Application Priority Data

Mar. 29, 2000 (JP) .............................. 2000-095239

(51) Int. Cl.
*G06G 12/00* (2006.01)
(52) U.S. Cl. ...................... 345/564; 345/531; 345/532; 345/572; 345/573; 345/565; 345/566
(58) Field of Classification Search ............... 398/564, 398/565; 345/544, 564–566, 540, 533, 541, 345/574, 502–504, 572, 573, 531, 532; 395/165; 348/475, 476, 563, 564, 569
See application file for complete search history.

(56) References Cited

U.S. PATENT DOCUMENTS

| | | | | |
|---|---|---|---|---|
| 4,755,810 A | * | 7/1988 | Knierim ..................... 340/726 |
| 4,984,208 A | * | 1/1991 | Sawada et al. ............. 365/222 |
| 4,987,551 A | * | 1/1991 | Garrett, Jr. .................. 345/162 |
| 5,227,863 A | * | 7/1993 | Bilbrey et al. .............. 348/578 |
| 5,673,087 A | * | 9/1997 | Choi et al. .................. 348/511 |
| 5,805,173 A | * | 9/1998 | Glennon et al. ............ 345/501 |
| 5,818,433 A | * | 10/1998 | Sherburne ................... 345/203 |
| 5,883,675 A | * | 3/1999 | Herz et al. .................. 348/465 |
| 6,002,447 A | | 12/1999 | Rumreich et al. |
| 6,173,367 B1 | * | 1/2001 | Aleksic et al. .............. 711/129 |
| 6,175,388 B1 | * | 1/2001 | Knox et al. ................. 348/569 |
| 6,233,658 B1 | * | 5/2001 | Tamura ....................... 711/150 |
| 6,300,964 B1 | * | 10/2001 | Intihar ........................ 345/574 |

* cited by examiner

*Primary Examiner*—Kimbinh T. Nguyen
(74) *Attorney, Agent, or Firm*—Arent Fox PLLC

(57) ABSTRACT

A memory control unit adjusts and sets the address of an image data area in the memory space of a memory and the address of a window area adjacent to the memory area, using a memory controller. The memory control unit stores data, other than image data that is supplied, at a specified address location and, when a control signal is sent to the memory, reads out the image data, including data stored in the window area, from the memory. The data that is read out from the window area is inserted into a predetermined position during a blanking period.

21 Claims, 2 Drawing Sheets

IMAGE PROCESSOR WITH THE CLOSED CAPTION FUNCTION AND IMAGE PROCESSING METHOD

BACKGROUND OF THE INVENTION

1. Field of the Invention

The present invention relates to an image processor and an image processing method, and more particularly to an image processor applicable to a decoder such as a video decoder which outputs video signals and inserts information directly into an image.

2. Description of the Background Art

In Japan, teletext broadcasting has been received by a monitor with a video decoder or a dedicated unit for receiving teletext broadcasting. When normal video is displayed, the monitor displays image data but not teletext data that is treated like a closed caption. The monitor displays teletext data only when the user requests it. More specifically, the monitor receives a signal that has teletext data inserted in a predetermined position during the vertical blanking period of the video signal and extracts the teletext data from the predetermined position for display on the monitor.

Data services using a similar technology is not limited to Japan. For example, the Federal Communications Commission (FCC) has proposed the standard for closed captions. The Electric Industry Association (EIA)-608 is one of related guideline standards. This standard recommends the data service for the 21st line. The closed caption, one of the technologies developed by the National Captioning Institute (NCI), is employed in the United States as the formal teletext method.

In practice, the data services using closed captions provided as a function of an image processor are executed by special hardware composed of many devices which write data into predetermined positions and read it back for transmission and by software controlled, for example, by the central processing unit (CPU).

An image processor or an image display that processes image data is required to process a large amount of data speedily. To satisfy this processing need, a Synchronous Dynamic Random Access Memory (SDRAM) is usually used as a frame memory.

An image processor is required to provide an enhanced data provision service through useful functions and speedy processing to differentiate it from similar image processors. An image processor is also required to provide at least the closed caption function to give more advantages and to provide new functions at lower costs. These requirements, in turn, require that the closed caption function be implemented in a simpler configuration.

SUMMARY OF THE INVENTION

The present invention seeks to solve the problems associated with the prior art described above. It is an object of the present invention to provide an image processor and an image processing method that allow the closed caption to be executed, without having to build an additional configuration for executing that function, but in the existing configuration.

To solve the above problem, an image processor in accordance with the present invention comprises a storage circuit storing therein image data; a data input/output circuit controlling input/output of the image data; an access control circuit controlling access of writing and reading the image data to and from the storage circuit; a refresh circuit controlling refreshing of the storage circuit; and a memory control circuit comprising an address generation circuit generating an address in the storage circuit to and from which the image data is written in and read out, wherein the memory control circuit comprises an area adjustment circuit which sets up an additional area adjacent to an area in which the image data is actually stored in a memory space of the storage circuit and storing therein data other than the image data, which adjusts the address generated by the address generation circuit, and which reads out the image data from the storage circuit, including the data in the additional area, in response to the address and a read control signal supplied to the storage circuit.

The image processor in accordance with the present invention uses the memory control circuit to adjust and set, in the memory space in the storage circuit, the address of the image data storage area in which the image data is actually stored and the address of the additional area adjacent to the image data storage area and stores supplied image data and data other than the image data at the respective address locations. When the read control signal is sent to the storage circuit, the image processor reads out the image data, including the data in the additional area, from the storage circuit and inserts the data read out from the additional area into a position corresponding to a blanking period. This simple configuration implements the closed caption function which inserts data into a position corresponding to a blanking period.

To solve the above problem, an image processing method in accordance with the present invention comprises the steps of setting up, in a storage circuit in which image data is stored, a range of an image area in which the image data is written and a range of an additional area which is adjacent to the image area and in which data other than the image data is written, with information supplied to a memory space of the storage circuit as a parameter; writing the data other than the image data from external into the additional area in the storage circuit according to a first write control signal; writing the image data at an address location of the image area in the storage circuit according to a second write control signal; and reading out the data stored in the additional area and the image data stored in the image area in the storage circuit in response to a read control signal.

The image processing method in accordance with the present invention sets the range of the additional area adjacent to the image area with information supplied to the memory space of the storage circuit as the parameter. When storing data, the method writes the data other than the image data at the address location of the additional area in the storage circuit in response to the first write control signal, and the image data at the address location of the image area in the storage circuit in response to a second write control signal. When reading out data, the method reads out the data and image data in response to the read control signal and inserts the data from the additional area into a predetermined position corresponding to a blanking period to send data, generated by the so-called closed caption function, as well as the image data.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

Figure 1:
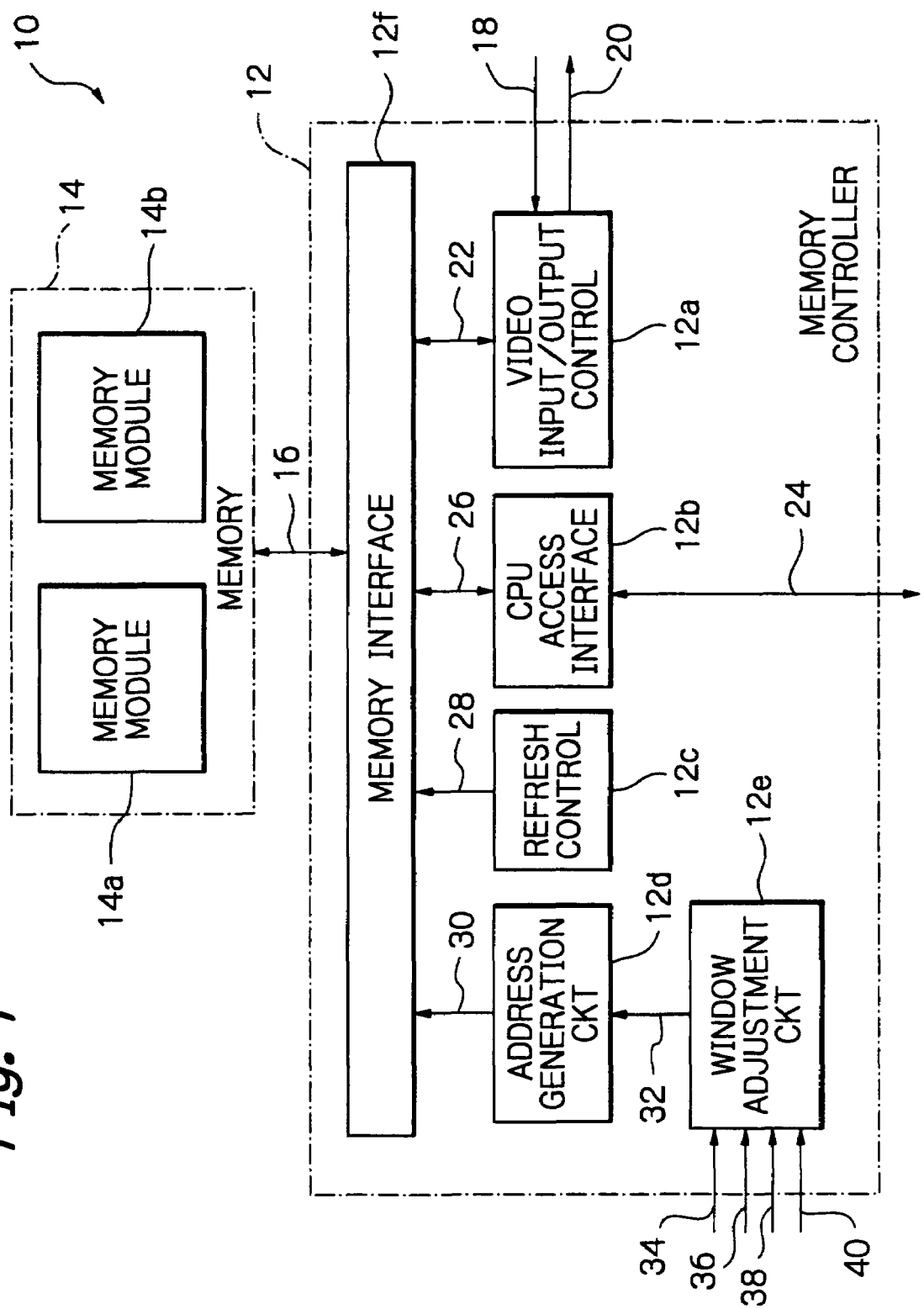
FIG. 1 is a schematic block diagram showing an embodiment of an image processor of the present invention applied to a memory control unit.

With reference to the accompanying drawings, a preferred embodiment of an image processor according to the present invention will be described in detail. The embodiment of the image processor in accordance with the present invention uses a memory control circuit to adjust and set, in a memory space in a storage circuit, the address of an image data storage area in which image data is actually stored and the address of an additional area adjacent to the image data storage area and stores supplied image data and data other than the image data. When a read control signal is sent to the storage circuit, the image processor reads out the image data, including the data in the additional area, from the storage circuit and inserts the data read out from the additional area into a position corresponding to a blanking period.

In this embodiment, the image processor according to the present invention is applied to a memory control unit 10. The illustration and the description of those parts not related directly to the present invention are omitted. The reference numeral of a signal is represented by the reference number of the corresponding connection line. The memory control unit 10 basically comprises a memory controller 12 and a memory 14. The memory controller 12 and the memory 14 are connected via a bus 16. The bus 16 comprises a plurality of signal lines. Not only image data and data but also input/output control signals and address data indicating data storage locations are transferred on the bus 16. The memory control unit 10 in this embodiment operates at clock speeds of about 50 MHz, not shown in the figure.

The memory controller 12 comprises a video input/output control circuit 12a, a CPU access interface 12b, a refresh control circuit 12c, an address generation circuit 12d, a window adjustment circuit 12e, and a memory interface 12f.

When writing data, the video input/output control circuit 12a outputs the write selection signal selecting one of memories into which image data 18 received from an external unit is to be supplied. When reading out data, the video input/output control circuit 12a outputs the read selection signal selecting one of memories from which data is to be supplied. This write selection signal also includes a second write control signal. The write selection signal and the read selection signal are supplied to the memory 14 via a bus 22, the memory interface 12f, and the bus 16. As will be detailed later, image data 20 that is read out as described above includes closed caption data from an additional area, that is, a window area that will be described later.

The CPU access interface 12b controls, via a CPU bus 24 connected to the CPU, not shown, the operation of the circuits connected to the memory interface 12f so that they operate in descending order of priority. The CPU access interface 12b supplies the control signal to the circuits in the memory controller 12 on a bus 26 and the memory interface 12f to control operation according to this priority. The CPU access interface 12b also sends closed caption data to the memory 14 under control of the CPU. Like the video input/output control circuit 12a, the CPU access interface 12b selects a memory into or from which data is to be written in or read out when writing in or reading out data to or from the memory 14.

The refresh control circuit 12c receives the top priority among the circuits in the memory controller 12. When an SDRAM is used as the memory, the refresh control circuit 12c measures the time with the use of the clock signals and updates data in the memory at regular intervals.

The address generation circuit 12d generates physical address data to be supplied to the memory 14. In general, the address generation circuit is designed to address storage locations of about one frame of image data. However, the address generation circuit 12d in this embodiment is configured to address storage locations apparently larger than those of one frame. This is because the address generation circuit is responsible for generating not only the address of one frame of image data but also the address of a closed caption. To generate the address of image data as well as the address of a closed caption, the address generation circuit 12d sets up an additional address space adjacent to the address space of one frame of image data. This additional address space is provided before or after the address space for one frame of image data to allow the contents of the additional address space to be read into a position corresponding to the blanking part. The address generation circuit 12d supplies the generated address to the memory 14 via a bus 30, the memory interface 12f, and the bus 16. How addresses are supplied will be described later with reference to the memory map.

The window adjustment circuit 12e adjusts the window start or end positions to cause the address generation circuit 12d to generate an additional address space as a window. The window adjustment circuit 12e supplies a window adjusting parameter 32 to the address generation circuit 12d. To execute this function, the window adjustment circuit 12e receives a synchronization signal 34, a window control signal 36, a number of transfer-data-lines 38, and a data transfer enable signal 40. The window adjustment circuit 12e extracts information from the window control signal 36 and the number of transfer-data-lines 38 signal, for example, on the falling edge of the synchronization signal 34. The window adjustment circuit 12e controls whether data may be input or output according to whether the enable signal 40 is high or low.

The window adjustment circuit 12e gets information on a position by which the window area is to be set up and information on the window width. The circuit does not always get information on the window width. This is because, when the window area is adjacent to the image data area and its width is to be set to that of the image data area, the window width information is not necessary. The window area setup position, if lower than the start position of the image data area, indicates the start position of the window area. In this case, the number of lines before the image data area may be calculated. For use when this calculation is not performed, the number of transfer-data-lines 38 is supplied to the window adjustment circuit 12e.

On the other hand, the window area setup position, if higher than the end position of the image data area, indicates the end position of the window or the start position of the end line. In this case, when the window area and the image data area have the same width, the number of lines of the width after the image data line may be calculated. When the window area width is not the same as that of the image data area or when this calculation is not performed, the window adjustment circuit 12e uses the number of transfer-data-lines 38. Under the condition described above, the window area may also be set up by supplying window area size information. Data input/output enable control is performed by the data transfer enable signal according to the setting.

Figure 2:
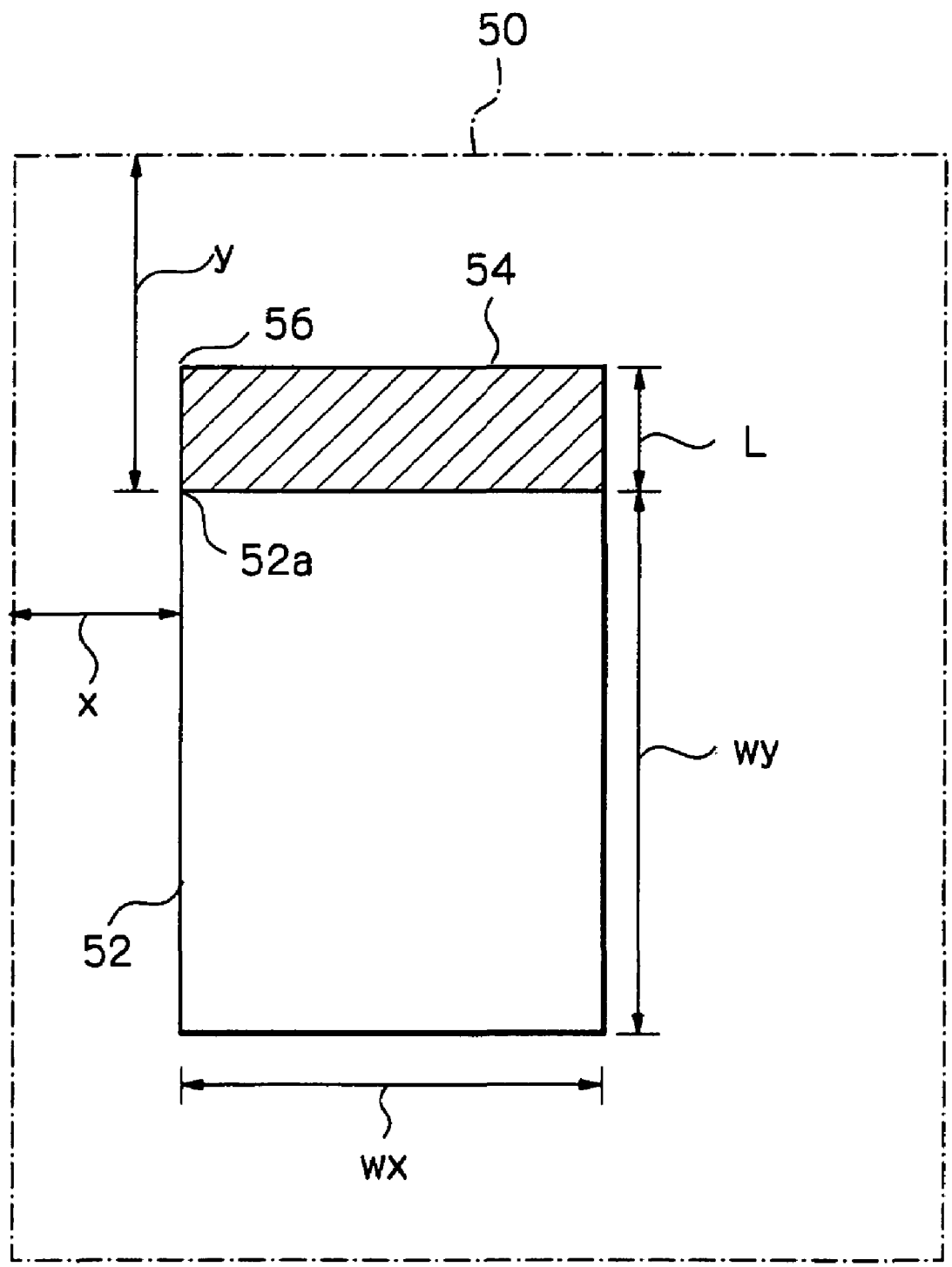
FIG. 2 is a schematic diagram showing the map of a memory space controlled by the memory control unit shown in FIG. 1.

The window area is adjacent to the image data area. In this embodiment, a more general case, in which the window area setup position supplied by the window control information does not indicate a location adjacent to the image data area, will be described with reference to a memory map, see FIG. 2. In this case, the window control signal 36 contains information on the start address 52a (x, y) of an image data area 52 and on the width and the number of lines (wx, wy) of the area 52. A memory map 50 indicates an area in the memory space of the memory modules 14a and 14b included in the memory 14 that will be described later.

As is understood from the memory map 50, both the image data area 52 and a window area 54 have the same horizontal width, wx, and the image data area 52 has the number of lines of a frame, wy. The window adjustment circuit 12e obtains the number of lines of the window area 54, L, from the number of transfer-data-lines 38. The obtained information determines the window area 54 indicated by the shaded area (range setting). More specifically, the start address of the window area 54 is the physical address 56 ((x, y-L)) that is L lines before the start address of the image data area 52. This position calculation may be done through simple arithmetic. The window adjustment circuit 12e obtains this information as the parameter and outputs it to the address generation circuit 12d to cause the address generation circuit 12d to generate an address based on the supplied parameter.

In the above example, the window area 54 immediately precedes the image data area 52. However, the window area 54 need not always precede the image data area 52 but may immediately follow it. In the latter, data is output from the window area 54 after the (vertical) synchronization signal 34 is disabled. Information as to where the window area 54 is to be provided, though not shown in the figure, may be supplied, for example, in the header as one of settings. This information may be read out under control of the software to set up the window control signal 36 and the number of transfer-data-lines 38.

The memory interface 12f is an interface via which signals, various types of data, and image data from the video input/output control circuit 12a, CPU access interface 12b, refresh control circuit 12c, and address generation circuit 12d of the memory controller 12 are sent to the memory 14. Also, image data and various types of data read out from the memory 14 are sent to the memory controller 12 via this interface. Image data read from the memory is output via the video input/output control circuit 12a. This data is the image data 20 that has been read.

Finally, the memory 14 will be described. The memory 14 comprises two memory modules, 14a and 14b. In this embodiment, the memory modules 14a and 14b are DRAMs synchronizing with clocks, that is, SDRAMs (Synchronous Dynamic Random Access Memories). Closed caption data and image data are written into or read out from the memory 14 based on the various control signals sent from the memory controller 12 over the bus 16.

The memory control unit 10, with the window function added to the physical address conversion function of the memory controller 12, uses the frame memory, allocated in the memory modules 14a and 14b of the memory 14 as well as the window area 54 that is an extra free memory. In this configuration, data such as closed captions and image data is read out from the window area 54 in response to the data transfer enable signal 40 (data read process: for instance, first and second read signals). It should be noted that closed caption data is read out during the blanking period. A point in time of the blanking period at which this data is read out is not described here. The image processor according to the present invention, with the simple configuration described above, reads out data in response to a request through a sequence of procedures, that is, range setting procedure, additional data writing procedure, image data writing procedure, and image data reading procedure. Although not shown in the figure, whether to display closed caption data with image data is controlled by the on/off control performed on the monitor.

Data stored in the window area 54 and read out therefrom is not limited to closed caption data. Non-image data, such as security data and RAS (Reliability Availability Serviceability) data, and image data may also be stored. In particular, when processing image data and the above-described non-image data, not one frame of image data but the data in the window area may be selectively displayed. Non-image-wise data and image data read out under control of the CPU access interface 12b are output via the video input/output control circuit 12a.

In the hybrid transmission scheme, the standard for teletext broadcasting in Japan, the 14th, 15th, 16th, and 21st lines of the vertical blanking periods are available for use. The standards for various types of data are defined hierarchically. This representation is based on method D recommended by the Consultative Committee on International Radio (CCIR) in 1986. The recommendation also includes methods A, B, and C.

The image processor according to the present invention, with a minor modification added to the configuration of the existing image processor, allows the user to selectively read desired data. This configuration makes it possible to add the closed caption function that is needed as a general function. Because there is no substantial change in the configuration of the memory control unit 10, its function may be further increased easily.

The entire disclosure of Japanese patent application No. 2000-95239 filed on Mar. 29, 2000, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiments without departing from the scope and spirit of the present invention.

What is claimed is:

1. An image processor comprising:
    a storage circuit storing therein image data;
    a data input/output circuit controlling input/output of the image data;
    an access control circuit controlling access of writing in and reading out the image data to and from said storage circuit;
    a refresh circuit controlling refreshing of said storage circuit; and
    a memory control circuit comprising an address generation circuit generating an address in said storage circuit to and from which the image data is written in and read out,
    said memory control circuit comprising a window adjustment circuit which sets up an additional window adjacent to a window in which the image data are actually stored in a memory space of said storage circuit and storing therein additional data other than the image data, which adjusts the address generated by said address generation circuit, and which reads out the image data from said storage circuit, including the additional data in the additional window, in response to the address and a read control signal supplied to said storage circuit, wherein the additional data are written in with an address of the additional window.

2. The image processor in accordance with claim 1, wherein said window adjustment circuit sets up the additional window immediately preceding or following the window in which the image data is stored.

3. The image processor in accordance with claim 1, wherein information on a position of the additional window is supplied as setting information included in header information.

4. The image processor in accordance with claim 2, wherein said window adjustment circuit sets a size of the additional window using information, which is obtained in synchronization with a supplied vertical synchronization signal, as a parameter and reads out the data stored in the additional window in response to a data transfer request.

5. The image processor in accordance with claim 1, wherein said window adjustment circuit obtains information on a base point in the memory space, a row direction width, and a column direction width and outputs the obtained information to said address generation circuit as a parameter.

6. The image processor in accordance with claim 2, wherein said window adjustment circuit obtains information on a base point in the memory space, a row direction width, and a column direction width and outputs the obtained information to said address generation circuit as a parameter.

7. The image processor in accordance with claim 4, wherein said window adjustment circuit obtains information on a base point in the memory space, a row direction width, and a column direction width and outputs the obtained information to said address generation circuit as a parameter.

8. The image processor in accordance with claim 5, wherein said window adjustment circuit supplies the additional data, which is read out from the additional window, to a predetermined position in a video signal.

9. The image processor in accordance with claim 6, wherein said window adjustment circuit supplies the additional data, which is read out from the additional window, to a predetermined position in a video signal.

10. The image processor in accordance with claim 7, wherein said window adjustment circuit supplies the additional data, which is read out from the additional window, to a predetermined position in a video signal.

11. The image processor in accordance with claim 1, wherein said access control circuit supplies the additional data other than the image data to said memory circuit.

12. The image processor in accordance with claim 1, wherein said additional window has an adjustable width.

13. An image processing method comprising the steps of:
setting up, in a storage circuit in which image data is stored, a range of an image window in which the image data is written and a range of an additional window which is adjacent to the image window and in which data other than the image data is written, with information supplied to a memory space of said storage circuit as a parameter;
writing the additional data other than the image data from external into the additional window in said storage circuit according to a first write control signal;
writing the image data at an address location of the image window in said storage circuit according to a second write control signal; and
reading out the additional data stored in the additional window and the image data stored in the image window in said storage circuit in response to a first read control signal,
wherein the additional data are written in with an address of the additional window.

14. The image processing method in accordance with claim 13, wherein said step of reading out the additional data comprises the steps of:
reading out the additional data from the additional window in said storage circuit in response to the first read control signal; and
reading out the image data from the image window in said storage circuit in response to a second read control signal.

15. The image processing method in accordance with claim 13, wherein the first write control signal and the read control signal are a transfer enable signal enabling an execution of processing.

16. The image processing method in accordance with claim 13, wherein said step of reading out the additional data inserts the additional data read out from the additional window into a predetermined position of a video signal.

17. An image processor comprising:
a storage circuit storing therein image data;
a data input/output circuit controlling input/output of the image data;
an access control circuit controlling access of writing in and reading out the image data to and from said storage circuit;
a refresh circuit controlling refreshing of said storage circuit; and
a memory control circuit comprising an address generation circuit generating an address in said storage circuit to and from which the image data is written in and read out, and generating an additional address of a width same as the address in said storage circuit to and from which data other than the image data is written in and read out,
said memory control circuit comprising a window adjustment circuit which sets up an additional window corresponding to the additional address and which is adjacent to a window in which the image data are actually stored in a memory space of said storage circuit and storing therein data other than the image data, which adjusts the address generated by said address generation circuit, and which reads out the image data from said storage circuit, including the additional data in the additional window, in response to the address and a read control signal supplied to said storage circuit, wherein the additional data are written in with an address of the additional window.

18. image processor in accordance with claim 17, wherein said additional window has an adjustable width.

19. An image processing method comprising the steps of:
setting up, in a storage circuit in which image data is stored, an address space for a range of an image window in which the image data is written, and an additional address space of a width same as the address space for a range of an additional window which is adjacent to the image window and in which data other than the image data is written, with information supplied to a memory space of said storage circuit as a parameter;

writing the additional data other than the image data from external into the additional window in said storage circuit according to a first write control signal;

writing the image data at an address location of the image window in said storage circuit according to a second write control signal; and reading out the additional data stored in the additional window and the image data stored in the image window in said storage circuit in response to a first read control signal, wherein the additional data are written in with an address of the additional window.

20. The image processing method in accordance with claim 19, wherein said additional window has an adjustable width.

21. An image processing method comprising the steps of:

setting up, in a storage circuit in which image data is stored, a range of an image window in which the image data is written and a range of an additional window which is adjacent to the image window and in which data other than the image data is written, with information supplied to a memory space of said storage circuit as a parameter;

writing the additional data other than the image data from external into the additional window in said storage circuit according to a first write control signal;

writing the image data at an address location of the image window in said storage circuit according to a second write control signal; and reading out the additional data stored in the additional window and the image data stored in the image window in said storage circuit in response to a first read control signal, wherein the additional data are written in with an address of the additional window; and wherein the additional data are teletext data.

* * * * *